(12) United States Patent
Kinlen et al.

(10) Patent No.: US 10,193,219 B2
(45) Date of Patent: Jan. 29, 2019

(54) SYSTEM AND METHOD FOR RECONFIGURABLE POLYMER ANTENNA

(71) Applicant: THE BOEING COMPANY, Chicago, IL (US)

(72) Inventors: Patrick J. Kinlen, Fenton, MO (US); Manny S. Urcia, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 152 days.

(21) Appl. No.: 15/349,769

(22) Filed: Nov. 11, 2016

(65) Prior Publication Data

US 2018/0138585 A1    May 17, 2018

(51) Int. Cl.
| | |
|---|---|
| *H01Q 3/01* | (2006.01) |
| *H01Q 1/28* | (2006.01) |
| *H01Q 1/36* | (2006.01) |
| *H01Q 9/14* | (2006.01) |

(52) U.S. Cl.
CPC ............ *H01Q 1/286* (2013.01); *H01Q 1/364* (2013.01); *H01Q 3/01* (2013.01); *H01Q 9/145* (2013.01)

(58) Field of Classification Search
CPC ............ H01Q 1/286; H01Q 3/01; H01Q 3/08; H01Q 1/28
USPC .................................................. 343/757, 705
See application file for complete search history.

(56) References Cited

U.S. PATENT DOCUMENTS

| | | | |
|---|---|---|---|
| 2004/0211989 A1 | 10/2004 | Armgarth et al. | |
| 2004/0256644 A1 | 12/2004 | Kugler et al. | |
| 2008/0209876 A1* | 9/2008 | Miller | G11C 13/0009 55/522 |
| 2011/0134004 A1* | 6/2011 | Takatsuka | H01Q 1/1264 343/757 |
| 2016/0127060 A1* | 5/2016 | Cross | H04B 7/18508 375/211 |
| 2016/0280162 A1* | 9/2016 | Yamada | B62D 35/00 |

FOREIGN PATENT DOCUMENTS

| | | |
|---|---|---|
| WO | 2015106132 A1 | 7/2015 |
| WO | 2015175556 A1 | 11/2015 |

OTHER PUBLICATIONS

Walczak et al., 'Poly(3,4-alkylenedioxypyrroles): The PXDOPs as Versatile Yet Underutilized Electroactive and Conducting Polymers', Advanced Materials, vol. 18, Issue 9; May 2006, (11 pages).
Kerszulis et al., 'Tuning the painter's palette: subtle steric effectson spectra and colour in conjugated electrochromic polymers', Journal of Materials Chemistry C, The Royal Society of Chemistry; Feb. 19, 2015, (8 pages).
Extended European Search Report for Application No. 17187297.1 dated Mar. 7, 2018, 8 pgs.

* cited by examiner

*Primary Examiner* — Hai V Tran
(74) *Attorney, Agent, or Firm* — Toler Law Group, PC

(57) ABSTRACT

An antenna includes an ion exchange material and at least one polymer member coupled to a communication circuit. The at least one polymer member is configured to, responsive to receiving a bias voltage, interact with the ion exchange material to change electrical conductivity of the at least one polymer member.

21 Claims, 6 Drawing Sheets

SYSTEM AND METHOD FOR RECONFIGURABLE POLYMER ANTENNA

FIELD OF THE DISCLOSURE

The present disclosure is generally related to reconfigurable polymer antennas.

BACKGROUND

Antennas have a corresponding operating frequency (e.g., resonant frequency) to receive and transmit communication signals. The operating frequency of an antenna is based on dimensions (e.g., size and shape) of the antenna. To illustrate, longer antennas generally have lower operating frequencies (e.g., longer wavelengths). Electronic devices may include multiple antennas to enable operation at different operating frequencies. For example, an electronic device (e.g., a cellular phone or a router) may include a first antenna to transmit and receive signals in a first frequency band (e.g., a Long Term Evolution (LTE) band) and a second antenna to transmit and receive signals in a second frequency band (e.g., an Institute of Electrical and Electronics Engineers (IEEE) 802.11 band or a third generation (3G) wireless band).

To enable miniaturization of electronic devices, reconfigurable antennas may be used to enable a single antenna to operate (e.g., transmit and receive) at multiple frequencies by changing a physical property of the antenna, such as a size or a shape of the antenna. For example, a reconfigurable antenna (e.g., a mechanically reconfigurable antenna) may change in length by using embedded switches, by stretching, or by moving conductive fluids. However, a mechanically reconfigurable antenna may be larger and have higher costs as compared to a multiple antenna arrangement.

SUMMARY

In a particular implementation, an antenna includes an ion exchange material and at least one polymer member coupled to a communication circuit. The at least one polymer member is configured to, responsive to receiving a bias voltage, interact witli the ion exchange material to change electrical conductivity of the at least one polymer member.

In another particular implementation, a communications system includes a communication circuit, a bias voltage source, and an antenna. The antenna includes an ion exchange material and at least one polymer member coupled to the communication circuit. The at least one polymer member is configured to, responsive to receiving a bias voltage from the bias voltage source, interact with the ion exchange material to change electrical conductivity of the at least one polymer member In another particular implementation, a method of communicating includes applying a bias voltage to at least one polymer member to change electrical conductivity of the at least one polymer member. The method also includes while applying the bias voltage, transmitting or receiving communication signals via the at least one polymer member.

DETAILED DESCRIPTION

Figure 1:
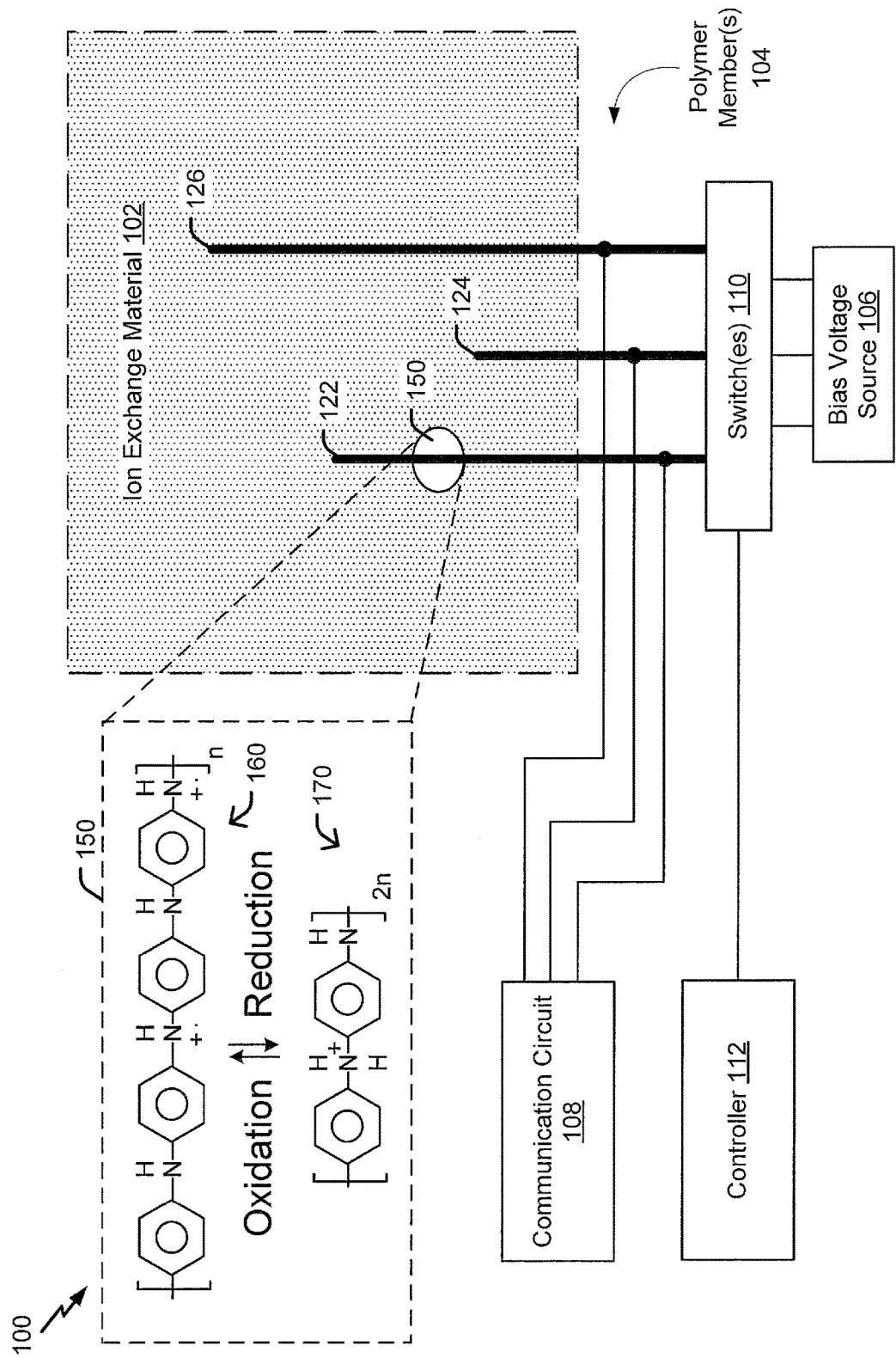
FIG. 1 is a block diagram that illustrates an example of a communications system including an electrically reconfigurable polymer antenna.

Implementations disclosed herein are directed to reconfigurable polymer antennas (e.g., electrically reconfigurable polymer antennas). An illustrative electrically reconfigurable polymer antenna includes at least one polymer member coupled to an ion exchange material. The at least one polymer member includes a conductive polymer, such as polyaniline, a poly(3,4-ethylenedioxythiophene) (PEDOTs), a poly(3,4-propylenedioxypyrrole) (poly(ProDOPs)). Conductive polymers may be intrinsically conductive or have semiconductor properties, and conductive polymers may have tunable electrical properties. The at least one polymer member is coupled to a bias voltage source which provides a bias voltage. In some implementations, the at least one polymer member is coupled to the bias voltage source via one or more switches. Additionally or alternatively, the bias voltage source may be adjustable (e.g., configurable to output multiple different bias voltages). For example, the bias voltage source may output bias voltages having different polarities, different magnitudes, or both.

The at least one polymer member is switchable between a first electrical conductivity and a second electrical conductivity responsive to receiving a bias voltage. For example, the at least one polymer member may be conductive responsive to receiving a first bias voltage (e.g., a positive bias voltage) and may be non-conductive responsive to receiving a second bias voltage (e.g., a negative bias voltage). To illustrate, application of the first bias voltage to the at least one polymer member may oxidize the polymer (e.g., cause the polymer to lose electrons to the ion exchange material) to change electrical conductivity of the at least one polymer member. The at least one polymer member may be conductive when in an oxidized state. Application of the second bias voltage to the at least one polymer member may reduce the polymer (e.g., cause the polymer to gain electrons from the ion exchange material) to change the electrical conductivity of the at least one polymer member. The at least one polymer member may be non-conducting (e.g., insulative) when in a reduced state. The ion exchange material is an ion donor or is an ion acceptor depending on a polarity of the bias voltage.

By varying the bias voltage, one or more polymer members of an electrically reconfigurable polymer antenna can be activated (e.g., become conductive) or deactivated (e.g., become non-conductive). Varying the conductivity of one or more polymer members can be used to change an operating frequency of the electrically reconfigurable polymer antenna. For example, by activating different length polymer members at different times an operating frequency of the electrically reconfigurable polymer antenna may be changed. As another example, by activating one or more polymer members coupled to each other, e.g. in series, a length and/or size, and/or shape of an active portion (e.g., the activated polymer members) of the electrically reconfigurable polymer antenna may be adjusted causing a change in the operating frequency of the electrically reconfigurable polymer antenna. Thus, the electrically reconfigurable polymer antenna is reconfigurable (e.g., switchable) responsive to a voltage or a voltage change applied to the electrically reconfigurable polymer antenna, in contrast to using a dimensional or size change to mechanically reconfigure the antenna to change operating frequencies. As compared to mechanically reconfigurable antennas, an electrically reconfigurable polymer antenna utilizes less space and has fewer or no moving parts. Additionally, electrically reconfigurable polymer antennas may use less energy to reconfigure (e.g., change operating frequencies) as compared to mechanically reconfigurable antennas. Electrically reconfigurable polymer antennas may change or switch between operating frequencies (e.g., reconfigure) faster than mechanically reconfigurable antennas. As electrically reconfigurable polymer antennas utilize less space and less energy, electrically reconfigurable polymer antennas may enable miniaturization of reconfigurable antennas.

An electrically reconfigurable polymer antenna may be included in a flexible circuit, and the at least one polymer member may be more compliant, more elastic, and more tolerant of deformation than antenna materials (e.g., metal) of mechanically reconfigurable antennas. Additionally, because polymers are typically less expensive than conductive metals (e.g., copper, silver, gold, platinum, etc.) used in non-polymer antennas, cost of an electrically reconfigurable polymer antenna may be reduced as compared to non-polymer antennas. As compared to fixed antennas, electrically reconfigurable polymer antennas enable operation at multiple frequencies (e.g., multiple frequency bands). Additionally, electrically reconfigurable polymer antennas may reduce a size of a communications system or an electronic device. For example, the electrically reconfigurable polymer antenna and communication circuitry may replace a plurality of antennas that each have dedicated communication circuitry, such as transceivers.

FIG. 1 illustrates an example of a communications system 100 that includes an electrically reconfigurable polymer antenna (referred to herein as an "ERP antenna"). The communications system 100 enables transmission of communications signals having multiple frequencies, reception of communications signals having multiple frequencies, or both. The communications system 100 includes an ion exchange material 102, at least one polymer member 104, a bias voltage source 106, and a communication circuit 108. The communications system 100 in FIG. 1 also includes one or more switches 110 and a controller 112. The communications system 100 (or a portion thereof) may be included in a flexible circuit. As an illustrative, non-limiting example, the ion exchange material 102 and the at least one polymer member 104 may be included on a flexible substrate. In a particular implementation, the communications system 100 is incorporated on or within an aircraft. In such implementations, the ERP antenna (e.g., the ion exchange material 102 and the at least one polymer member 104) may be included in an applique that is coupled to an exterior of the aircraft.

The ion exchange material 102 includes mobile ions and is configured to exchange ions with the at least one polymer member 104 to oxidize and to reduce (e.g., gain electrons) the at least one polymer member 104. The ion exchange material 102 may include or correspond to an electrolyte solution, an ionic liquid (e.g., an organic salt which exists in molten state at room temperature), an ionic gel, or a polymer ionic medium. As an illustrative, non-limiting example, the ion exchange material 102 includes 1-Ethyl-3-methylimidazoliumbis(trifluoromethylsulfonyl)imide (EMI-IM). In a particular implementation, the ion exchange material 102 is coupled to or encapsulated by one or more layers of a non-reactive material. In some implementations, the non-reactive material includes a non-reactive polymer, such as polyvinylidene difluoride (PVDF).

The at least one polymer member 104 is coupled to the ion exchange material 102. For example, at least a portion of the at least one polymer member 104 is in electrical contact or connection with the ion exchange material 102. To illustrate, ions (e.g., cations, anions, or both) of the ion exchange material 102 flow to the at least one polymer member 104 to interact with (e.g., undergo oxidation or reduction) the at least one polymer member 104. Exemplary couplings between the at least one polymer member 104 and the ion exchange material 102 are described further with reference to FIG. 2. The at least one polymer member 104 may include conductive polymers, such as intrinsically conductive polymers (ICPs). As illustrative, non-limiting examples, conductive polymers include polyaniline, PEDOTs, and poly(ProDOPs).

The ERP antenna includes the ion exchange material 102 and the at least one polymer member 104. The ERP antenna may correspond to a monopole antenna, a dipole antenna, an array antenna, a loop antenna, an aperture antenna, or a combination thereof. In a particular implementation, the ERP antenna is included in an array of antennas.

In some implementations, the at least one polymer member 104 includes multiple polymer members. In a particular implementation, the at least one polymer member 104 includes a first polymer member 122, a second polymer member 124, and a third polymer member 126. In other implementations, the ERP antenna may include more than three or fewer than three polymer members. Each polymer member of the at least one polymer member 104 may have a different physical configuration. For example, a size, a shape, or both, of one polymer member may differ from another polymer member. To illustrate, the first polymer member 122 is longer than the second polymer member 124 and shorter than the third polymer member 126, as illustrated in FIG. 1. In other implementations, each of the polymer members 122, 124, 126 may have the same length and a different shape. As illustrative, non-limiting examples, the shapes of the polymer members 122, 124, 126 may include or correspond to a loop, a coil, a hexagon, or a spiral. To illustrate, the first polymer member 122 may be straight and the second polymer member 124 may be a coil or curved. The different shapes of the multiple polymer members may correspond to different types of antennas. For example, the first polymer member 122 may be a monopole antenna having a first shape, and the second polymer member 124 may be a dipole antenna or a loop antenna having a second shape.

Additionally or alternatively, one or more polymer members of the at least one polymer member 104 may include different materials. For example, the first polymer member 122 made include a first polymer, and the second polymer member 124 may include a second polymer that is different from the first polymer. As a particular illustrative, non-limiting example, the first polymer may be a polyaniline and the second polymer may be a PEDOT or a poly(ProDOP).

The bias voltage source 106 is coupled to the at least one polymer member 104. The bias voltage source 106 may include or correspond to a direct current (DC) bias voltage source. The bias voltage source 106 is configured to generate (or output) one or more bias voltages that are applied to the at least one polymer member 104. For example, the bias voltage source 106 may output two bias voltages: a first bias voltage (e.g., +1 volt (V)) and a second bias (e.g., −1 V) voltage at the same time. In other implementations, the bias voltage source 106 may be configured to output more than two bias voltages.

In some implementations, the bias voltage source 106 is configured to adjust a bias voltage magnitude. For example, the bias voltage source 106 may be configured to adjust the first bias voltage (e.g., +1 V) to a third bias voltage (e.g., 3 V, 5 V, etc.). In such implementations, the controller 112 may be coupled to the bias voltage source 106 and may be configured to adjust the magnitude, a polarity, or both, of the bias voltage output by the bias voltage source 106. Additionally, the bias voltage source 106 may adjust or tune the bias voltage to optimize or tune the at least one polymer member 104. To illustrate, the bias voltage source 106 may adjust the first bias voltage (e.g., +1 V) to a fourth bias voltage (e.g., +1.1 V) to optimize or tune the at least one polymer member 104 to the first communication frequency.

Application of the bias voltages to the at least one polymer member 104 may cause the ion exchange material 102 and the at least one polymer member 104 to exchange ions (e.g., undergo oxidation or reduction). Referring to diagram 150, shown in FIG. 1, an illustrative depiction of an exemplary redox reaction of a particular polyaniline (e.g., Emeraldine salt 160 and Leucoemeraldine salt 170) caused by applying bias voltages to the first polymer member 122 is shown. In the diagram 150, the first polymer member 122 is oxidized by radical cations of the ion exchange material 102 flowing to the Emeraldine salt 160 responsive to receiving the first bias voltage. In the diagram 150, the first polymer member 122 undergoes reduction by radical anions of the ion exchange material 102 flowing to the Leucoemeraldine salt 170 responsive to receiving to the second bias voltage. In the diagram 150, "n" represents a degree of polymerization.

The communication circuit 108 is coupled to the at least one polymer member 104. The communication circuit 108 includes one or more components configured to enable wireless communication, such as one or more transceivers, one or more filters, one or more amplifiers, one or more mixers, one or more modulators, one or more demodulators, one or more converters, etc. The transceivers may include one or more transmitters and one or more receivers. The communication circuit 108 may be included in a wireless communication device, such as a mobile phone, a portable computing device, a wireless router, etc. In some implementations, the communications system 100 includes multiple communication circuits. In a particular implementation, each communication circuit of the multiple communication circuits is coupled to a different polymer member of the at least one polymer member.

The one or more switches 110 are coupled to the at least one polymer member 104 and the bias voltage source 106 to enable the at least one polymer member 104 to be selectively coupleable with (e.g., couple to and decouple from) the bias voltage source 106. The one or more switches 110 may include or correspond to a switching network or a permutation network, as illustrative, non-limiting examples. The one or more switches 110 may include one or more switching elements (e.g., relays). As an illustrative, non-limiting example, the one or more switches 110 include one or more transistors. The one or more switches 110 are configured to selectively provide the bias voltage output by the bias voltage source 106 to the at least one polymer member 104. For example, the one or more switches 110 receive one or more control signals from the controller 112 and provide the first bias voltage to the first polymer member 122 and may provide the second bias voltage to the second polymer member 124 and to the third polymer member 126 responsive to the one or more control signals. In response to control signals indicating deactivation, the one or more switches 110 may isolate one or more polymer members from a bias voltage.

The controller 112 is coupled to the one or more switches 110 and configured to control the one or more switches 110 based on a communication frequency setting. The communication frequency setting may be input by a user or may be determined by the controller 112 based on an operational setting of the electronic device. For example, the controller 112 may receive the operational setting from another component (e.g., a processor) of the electronic device or may determine the operational setting based on one or more parameters or conditions. As illustrative, non-limiting examples, the operational setting may include or correspond to a type of communication signal (e.g., a narrowband communication signal, a wideband communication signal, a broadband communication signal), a channel (e.g., a 2.4 gigahertz (GHz) channel or a 5.8 GHz channel) of a multichannel device, or a band of a cellular network (e.g., Long Term Evolution (LTE), fourth generation wireless (4G), third generation wireless (3G), etc.). In a particular implementation, the operational setting is associated with a communication protocol, such as an IEEE communication protocol or a cellular protocol (e.g., an LTE protocol, a Global System for Mobile Communications (GSM) protocol, or a code division multiple access (CDMA) protocol, etc.).

During operation, the controller 112 may receive or determine a first operational setting. The controller 112 may send (or adjust) one or more control signals to the one or more switches 110. Responsive to the one or more control signals, the one or more switches 110 provide (e.g., transfer from the bias voltage source 106) the first bias voltage (e.g., +1 V) to the first polymer member 122. Additionally, responsive to the one or more control signals, the one or more switches 110 provide the second bias voltage (e.g., −1 V) to the second polymer member 124 and to the third polymer member 126. The first bias voltage changes the electrical conductivity of the first polymer member 122 to a first electrical conductivity such that the first polymer member 122 is in a conductive state. Placing the first polymer member 122 in the conductive state activates the first polymer member 122 to transmit or receive first communication signals associated with a first frequency range. While the first bias voltage is being applied to the first polymer member 122, the first communication signals may be received by the first polymer member 122 and are relayed to the communication circuit 108 for processing. Additionally or alternatively, the communication circuit 108 may generate the first communication signals and may transmit the first communication signals via the first polymer member 122 while the first bias voltage is being applied to the first polymer member 122.

Additionally, the second bias voltage changes the electrical conductivity of the second polymer member 124 and the third polymer member 126 to a second electrical conductivity such that the second polymer member 124 and the third polymer member 126 are in a non-conductive (e.g., insulative) state. The first electrical conductivity may be greater than the second electrical conductivity. The second bias voltage deactivates the second polymer member 124 and the third polymer member 126. While the second bias voltage is being applied to the second polymer member 124 and to the third polymer member 126, the second polymer member 124 and the third polymer member 126 are not able to transmit or receive communication signals. Although described as corresponding to a conductive state and a non-conductive state, in other implementations, the first electrical conductivity and the second electrical conductivity may correspond to other states (e.g., partially conductive states) or to different degrees of electrical conductivity.

After the first communication signals are transmitted or received, the controller 112 may receive or determine a second operational setting. As an illustrative, non-limiting example, the second operational setting may be input by a user. The controller 112 may send (or adjust) the one or more control signals to the one or more switches 110. Responsive to the one or more control signals, the one or more switches 110 provide the first bias voltage (e.g., +1 V) to the third polymer member 126 and the second bias voltage (e.g., −1 V) to the first polymer member 122 and to the second polymer member 124. The first bias voltage changes the electrical conductivity of the third polymer member 126. To illustrate, the first bias voltage activates the third polymer member 126 to transmit or receive second communication signals associated with a second frequency range. While the first bias voltage is being applied to the third polymer member 126, the second communication signals may be received by the third polymer member 126 and relayed to the communication circuit 108 for processing. Additionally or alternatively, the communication circuit 108 may generate the second communication signals and transmit the second communication signals via the third polymer member 126 while the first bias voltage is being applied to the third polymer member 126.

Additionally, the second bias voltage may change the electrical conductivity of the first polymer member 122, the second polymer member 124, or both to be in a non-conductive (e.g., insulative) state. The second bias voltage deactivates the first polymer member 122 and the second polymer member 124. While the second bias voltage is being applied to the first polymer member 122 and to the second polymer member 124, the first polymer member 122 and the second polymer member 124 are not able to transmit or receive communication signals.

A response rate (e.g., a switching rate between conductive and non-conductive states) of the at least one polymer member 104 may be a few milliseconds. Because of the response rate of the at least one polymer member 104, the at least one polymer member 104 may receive large voltage (e.g., larger than the bias voltage) alternating current (AC) signals for transmitting high frequency communication signals (e.g., megahertz signals) while in the conductive state without switching to the non-conductive state. To illustrate, because a frequency of the large voltage AC signal is greater (e.g., faster) than the response rate of the at least one polymer member 104, a temporary negative polarity of the large voltage AC signal may not change the electrical conductivity of the at least one polymer member 104. To illustrate, when the large voltage AC signal is applied to the at least one polymer member 104, the at least one polymer member 104 may not respond fast enough (e.g., the Emeraldine salt 160 may not undergo reduction to the Leucoemeraldine salt 170 while the large voltage AC signal has a negative polarity) such that the large voltage AC signal will not switch the at least one polymer member 104 between conductive and non-conductive states.

In some implementations, the communications system 100 includes a second bias voltage source. In such implementations, the second bias voltage source may provide the third bias voltage (e.g., +3V) while the bias voltage source 106 provides the first bias voltage (e.g., +1V) and the second bias voltage (e.g., −1V). In some implementations, the bias voltage source 106 corresponds to a floating power source (e.g. an ungrounded power source). In other implementations, the bias voltage source 106 is grounded. Additionally or alternatively, the at least one polymer member 104 may be floating or grounded. Additionally or alternatively, one or more components of the communication circuit 108 are coupled to ground.

In some implementations, the at least one polymer member 104 may include multiple polymer members arranged as or corresponding to electrodes. For example, the first polymer member 122 may operate as a cathode that is responsive to the first bias voltage, and the second polymer member 124, the third polymer member 126, or both, may operate as an anode that is responsive to the second bias voltage.

Additionally, a polymer member may operate as a switch (e.g., a relay) in a circuit or in a flexible circuit. To illustrate, the first polymer member 122 may be configured to switch between the conductive state to enable current flow and the non-conductive state to disable current flow. In a particular implementation, a polymer member operates as an embedded switch in non-polymer reconfigurable antennas. For example, the first polymer member 122 may be coupled to two metal portions (e.g., metal traces) of the non-polymer reconfigurable antenna. Application of a bias voltage may electrically couple the two metal portions together with the first polymer member 122 and alter an active length (e.g., a conductive length) of the non-polymer reconfigurable antenna.

The ERP antenna of the communications system 100 provides benefits as compared to mechanically reconfigurable antennas. For example, an ERP antenna may be included in a flexible circuit, and the at least one polymer member may be more compliant, more elastic, and more tolerant of deformation than metallic antenna components. Additionally, an ERP antenna may have a lower materials cost than metal antennas because polymers are less expensive than conductive metals (e.g., copper, silver, gold, platinum, etc.) used in non-polymer antennas. As compared to mechanically reconfigurable antennas, an ERP antenna utilizes less space and may have fewer moving parts. Additionally, ERP antennas may use less energy to reconfigure (e.g., change operating frequencies) as compared to mechanically reconfigurable antennas. Furthermore, ERP antennas may change or switch between operating frequencies (e.g., reconfigure) faster than mechanically reconfigurable antennas.

Figure 2:
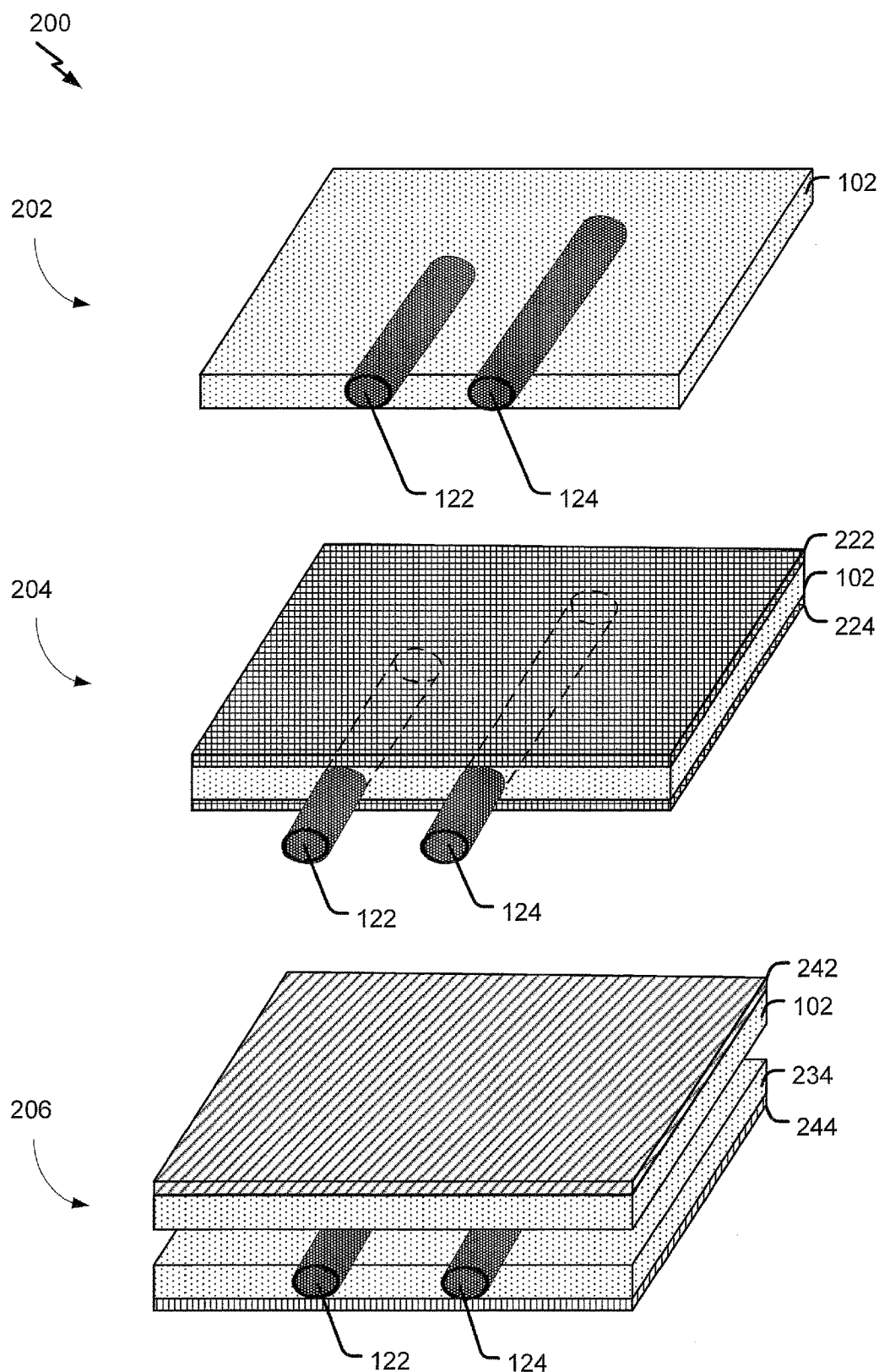
FIG. 2 is a diagram that illustrates examples of one or more electrically reconfigurable polymer antennas.

FIG. 2 illustrates example diagrams of ERP antenna configurations. In FIG. 2, three illustrative configurations 202, 204, 206 of ion exchange materials and polymer members are depicted and generally designated 200. In a first configuration 202, the first polymer member 122 and the second polymer member 124 are coupled (e.g., electrically coupled) to the ion exchange material 102. As illustrated in FIG. 2, a portion of each of the polymer members 122 and 124 is coupled to one side of a single layer of the ion exchange material 102.

In a second configuration 204, the first polymer member 122 and the second polymer member 124 are encapsulated by the ion exchange material 102. The ion exchange material 102 is also coupled to (or encapsulated by) two layers 222, 224 of non-reactive material, such as PVDF. As compared to the first configuration 202, the second configuration 204 has a larger surface contact area between the polymer members 122 and 124 and the ion exchange material 102. Accordingly, the second configuration 204 provides more surface area for electrons (or ions) to be exchanged between the ion exchange material 102 and the polymer members 122 and 124 during oxidation or reduction of the polymer members 122 and 124 as compared to the first configuration 202. Thus, the polymer members 122 and 124 in the second configuration 204 may switch between the conductive state and the non-conductive state (or other conductive states) faster, may be more conductive, or both, as compared to the first configuration 202.

In a third configuration 206, the first polymer member 122 and the second polymer member 124 are coupled to (and positioned between) a first layer of the ion exchange material 102 and a second layer of ion exchange material 234. Although the first polymer member 122 and the second polymer member 124 are illustrated as having circular (or elliptical) cross sections and straight line shapes, in other implementations one or more of the polymer members 122, 124 may have a different cross section shape (e.g., flat, rectangular, etc.), may have a different shape (coil, hexagon, etc.), may have different dimensions (e.g., width or length), or a combination thereof. The third configuration 206 provides more surface area for electrons (or ions) to be exchanged between the layers of ion exchange material 102, 234 and the polymer members 122 and 124 during oxidation or reduction of the polymer members 122 and 124 as compared to the first configuration 202 and may be less expensive and complex to manufacture than the second configuration 204.

Additionally, one or more of the configurations 202, 204, 206 may include one or more additional layers, such as a protective layer 242 (e.g., a coating), an adhesive layer 244, or both, as illustrated in the third configuration 206. The protective layer 242 is configured to protect and/or insulate the polymer members 122, 124 and the ion exchange material 102, 234 from other components, ambient conditions, or both. The protective layer 242 is in contact with the first layer of ion exchange material 102 as illustrated in the third view 306. In other implementations, the protective layer 242 may be in contact with the polymer members 122, 124 or a layer of non-reactive material (e.g., the layers 222, 224). As illustrated in the third configuration 206, the adhesive layer 242 is in contact with the second layer of the ion exchange material 234. In other implementations, the adhesive layer 242 may be in contact with the polymer members 122, 124 or a layer of non-reactive material (e.g., the layers 222, 224). The adhesive layer 244 may be configured to couple or adhere to a surface (e.g., a surface of a vehicle or a structure) via surface tension (e.g., surface tension of intermolecular forces of molecules of the adhesive layer 244), static electricity (e.g., electrostatic adhesion or static cling), or an adhesive material.

The configurations 202, 204, 206 may be produced by means of sputtering, evaporation coating, chemical vapor deposition (CVD), physical vapor deposition (PVD), printing (e.g., 3-D printing), etc. In such implementations where the configurations 202, 204, 206 are produced by printing, a printer (e.g., a 3-D printer) may deposit materials in one or more passes to form one or more of the polymer members 122, 124, the layers of the ion exchange material 102, 234, the layers 222, 224 of the non-reactive material, the protective layer 242, or the adhesive layer 244. In a particular implementation, the configurations 202, 204, 206 may be produced as an applique. For example, the configurations 202, 204, 206 may include one or more of the protective layer 242 or the adhesive layer 244. The applique is flexible and may conform to a shape of a surface to which the applique is coupled to. The applique may include or correspond to a conformal antenna and may be coupled to a vehicle, such as an aircraft.

Figure 3:
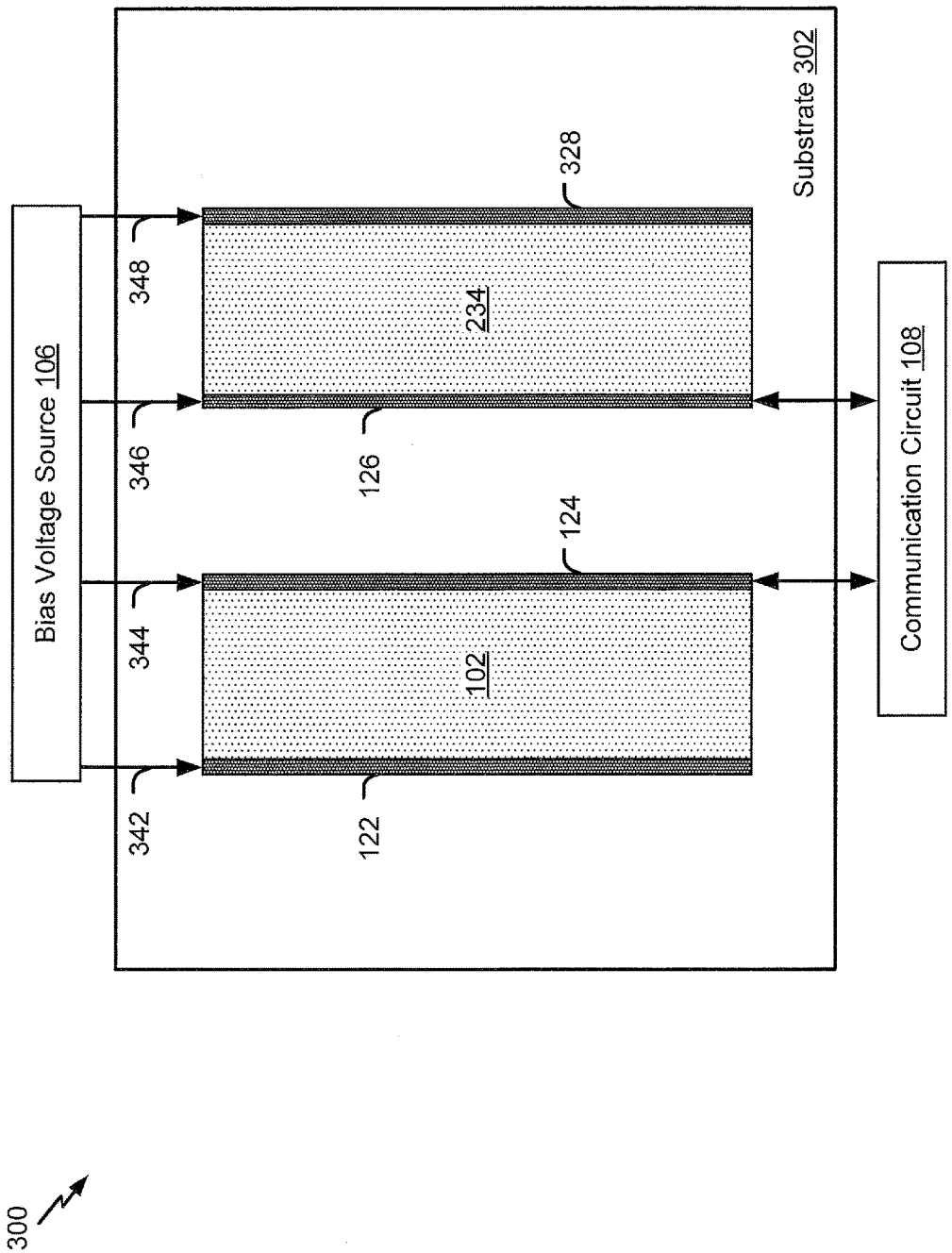
FIG. 3 is a diagram that illustrates an example configuration of an electrically reconfigurable polymer antenna.

FIG. 3 illustrates an example configuration 300 of an ERP antenna. The configuration 300 of the ERP antenna may be included in a communications system, such as the communications system 100 of FIG. 1. In FIG. 3, a substrate 302 includes two ion exchange materials 102, 234 positioned between four polymer members 122, 124, 126, 328. The ion exchange material 102 (e.g., a first ion exchange material) is positioned between the first polymer member 122 and the second polymer member 124. A second ion exchange material 234 is positioned between the third polymer member 126 and a fourth polymer member 328. As, an illustrative, non-limiting example, the substrate 302 may include or correspond to a flexible printed circuit board. In other implementations, the substrate 302 may include more than two ion exchange materials or fewer than two ion exchange materials. Additionally or alternatively, the substrate 302 may include more polymer members or fewer polymer members.

The polymer members 122, 124, 126, 328 are configured to receive a bias voltage from the bias voltage source 106 and to transmit and receive communication signals wirelessly. The polymer members 122, 124, 126, 328 receive a bias voltage (e.g., DC signals) from the bias voltage source 106 at a first location (e.g., a top end as illustrated in FIG. 3) and are configured to transmit received communication signals to and receive communication signals to be transmitted (e.g., AC signals) from the communication circuit 108 from a second location (e.g., such as a bottom end as illustrated in FIG. 3).

As illustrated in FIG. 3, the bias voltage source 106 outputs bias voltage on four lines 342, 344, 346, 348 to the polymer members 122, 124, 126, 328. In other implementations, the bias voltage source 106 may output more than four lines or fewer than four lines and the lines are controlled by switches, such as the one or more switches 110 of FIG. 1.

During operation, the bias voltage source 106 provides a first bias voltage (e.g., a positive bias voltage) to the first polymer member 122 and the fourth polymer member 328 via the lines 342, 348 and provides a second bias voltage (e.g., a negative bias voltage) to the second polymer member 124 and the third polymer member 126 via the lines 344, 346. The first bias voltage causes the first polymer member 122 and the fourth polymer member 328 to be oxidized and to be in a conducting state. The second bias voltage causes the second polymer member 124 and the third polymer member 126 to be reduced and to be in a non-conducting (e.g., insulative) state. As the second polymer member 124 and the third polymer member 126 are in the insulative state, the second polymer member 124 and the third polymer member 126 do not transmit or receive communication signals.

The bias voltage source 106 or switching arrangement between the bias voltage source and the polymer members 122, 124, 126, 328 is configured to switch the bias voltages provided to one or more of the polymer members 122, 124, 126, 328 to enable transmission and reception of communication signals. To illustrate, to enable transmission, reception, or both, of communication signals, the bias voltage source 106 provides the second bias voltage (e.g., the negative bias voltage) to the first polymer member 122 and the fourth polymer member 328 via the lines 342, 348 and provides the first bias voltage (e.g., a positive bias voltage) to the second polymer member 124 and the third polymer member 126 via the lines 344, 346. The second bias voltage causes the first polymer member 122 and the fourth polymer member 328 to be reduced and to be in the non-conducting (e.g., insulative) state. The first bias voltage causes the second polymer member 124 and the third polymer member 126 to be oxidized and to be in the conducting state. While the second polymer member 124 and the third polymer member 126 are in the conductive state, the second polymer member 124 and the third polymer member 126 are able to transmit and/or receive communication signals. As an illustrative, non-limiting example, the second polymer member 124 may transmit communication signals and the third polymer member 126 may receive communication signals. As another example, the second polymer member 124 may transmit and/or receive first communication signals having a first frequency and the third polymer member 126 may transmit and/or receive second conunumication signals having a second frequency.

Although the polymer members 122, 124, 126, 328 are illustrated as the same size in FIG. 3, in other implementations one or more of the polymer members 122, 124, 126, 328 have a different size (e.g., length). For example, the polymer members 122, 124 may be shorter than the polymer members 126, 328 to enable transmitting and/or receiving signals having different frequencies. In such implementations, the bias voltage source 106 may provide different magnitude bias voltages to one or more of the polymer members 122, 124, 126, 328. For example, the bias voltage source 106 may provide a higher magnitude bias voltage to the polymer members 126, 328. The configuration 300 may be produced by means of sputtering, evaporation coating, chemical vapor deposition (CVD), physical vapor deposition (PVD), printing (e.g., 3-D printing), etc. The configuration 300 may be produced as an applique, as described with reference to FIG. 2.

Figure 4:
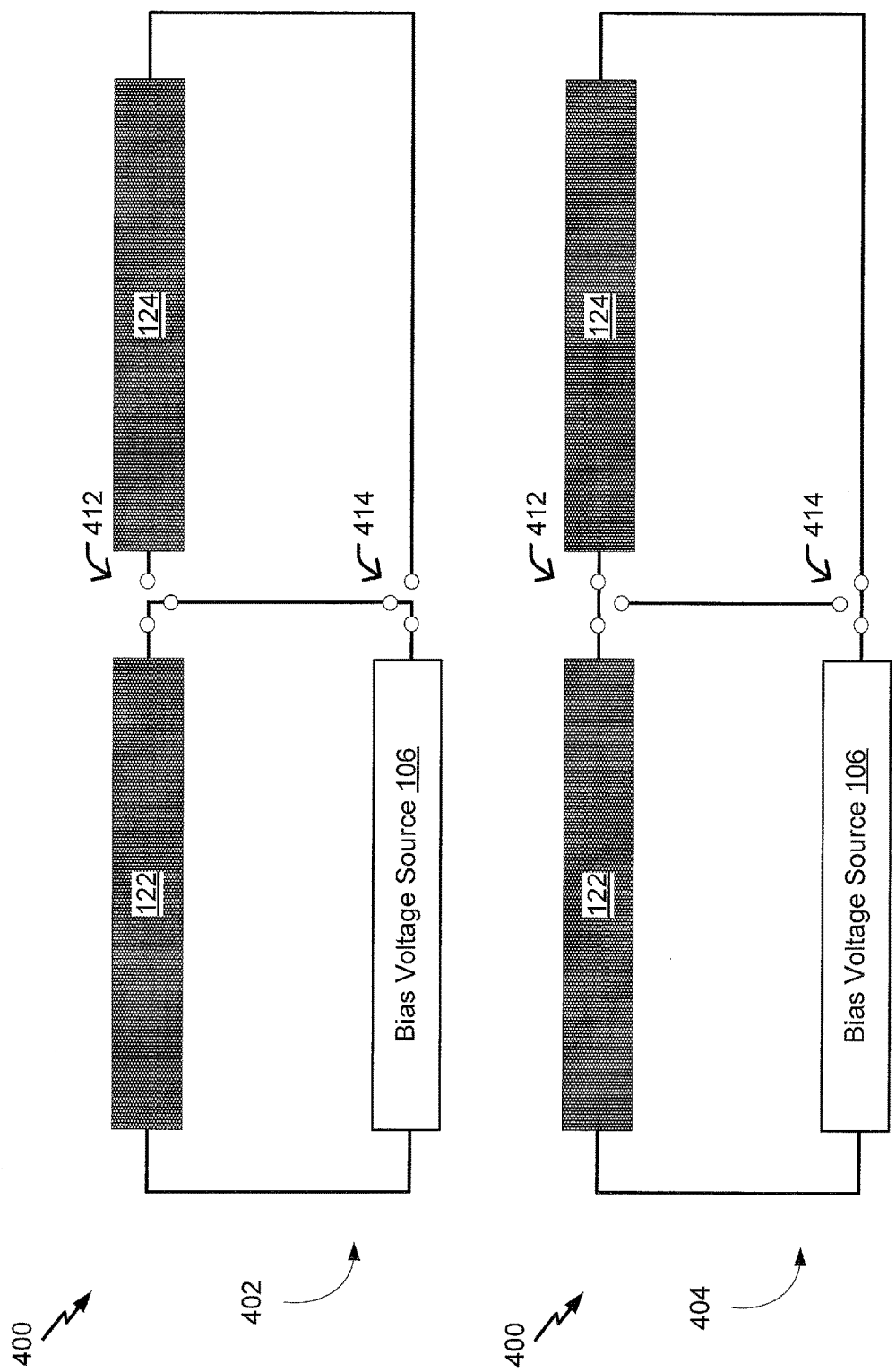
FIG. 4 is a diagram that illustrates an example circuit including an electrically reconfigurable polymer antenna.

FIG. 4 illustrates an example of a circuit 400 that includes of an example ERP antenna. The circuit 400 may be included in a communications system, such as the communications system 100 of FIG. 1. The circuit 400 includes multiple polymer members that are selectively coupleable with each other. In FIG. 4, the first polymer member 122 is selectively coupleable in series with the second polymer member 124. To illustrate, the circuit 400 includes a first switch 412 and a second switch 414 configured to decouple the second polymer member 124 from the first polymer member 122. As illustrated in FIG. 4, the first switch 412 and the second switch 414 are single-pole, double-throw switches (e.g., three-way switches). In other implementations, other types of switches may be used (e.g., transistors, three-position switches, dual-pole double-throw switches, etc.) and/or more than two switches or fewer than two switches may be used. Additionally or alternatively, the circuit 400 may include multiple polymer members coupled in parallel with one another. The switches 412, 414 are controlled by a controller (not shown), such as the controller 112 of FIG. 1.

During operation, the switches 412, 414 may be in a first position as illustrated in a first diagram 402. When the switches 412, 414 are in the first position, the bias voltage source 106 may provide a bias voltage to the first polymer member 122 and may not provide the bias voltage to the second polymer member 124. In response to receiving a first bias voltage, the first polymer member 122 may transition to the conductive state, as described with reference to FIG. 1. While the first polymer member 122 receives the first bias voltage, the first polymer member 122 is capable of transmitting and/or receiving first communication signals, as described with reference to FIG. 1. The first communication signals are associated with a first communication band or type, such as a Wi-Fi band.

The circuit 400 may transition between the first band (e.g., the Wi-Fi band) and a second band (e.g., an LTE band). The controller activates the switches 412, 414 from the first position (as illustrated in the first diagram 402) to a second position (as illustrated in a second diagram 404) to connect the second polymer member 124 to the bias voltage source 106 and to connect the first polymer member 122 and the second polymer member 134 in series. When the switches 412, 414 are in the second position, the bias voltage source 106 may provide a bias voltage to the first polymer member 122 and to the second polymer member 124. In response to receiving the first bias voltage (or a second bias voltage), the first polymer member 122 and the second polymer member 123 may transition to the conductive state, as described with reference to FIG. 1.

Because the first polymer member 122 and the second polymer member 124 are in the conductive state and are coupled in series, an active length of the ERP increases and an operating frequency of the ERP may change (e.g., decrease). While the first polymer member 122 and the second polymer member 124 receive the first bias voltage (or the second bias voltage), the coupled polymer members 122, 124 are capable of transmitting and/or receiving second communication signals, as described with reference to FIG. 1. The second communication signals are associated with the second communication band or type (e.g., the LTE band).

In some implementations, the switches 412, 414 may be implemented as polymer members (e.g., polymer switches) and may be switched between the first position and the second position responsive to receiving a bias voltage from the bias voltage source 106 or another bias voltage source. In a particular implementation, the polymer members 122, 124 may be replaced with metal antenna members and the polymer switches may function to selectively couple a second metal antenna member to a first metal antenna member to change between the first band and the second band. Additionally, polymer switches may be used as an alternative to metallic switches in flexible circuits or in non-metal circuits and may provide more flexibility than metallic switches.

The circuit 400 (or a portion thereof) may be produced as an applique, as described with reference to FIG. 2. For example, one or more of the multiple polymer members 122, 124 may be formed on or as a layer of an applique. By switching between the first band and the second band by reconfiguring the circuit 400, the circuit 400 may reduce power consumption as compared to circuits which operate in more than one band without turning off an antenna or circuitry to process the more than one band.

Figure 5:
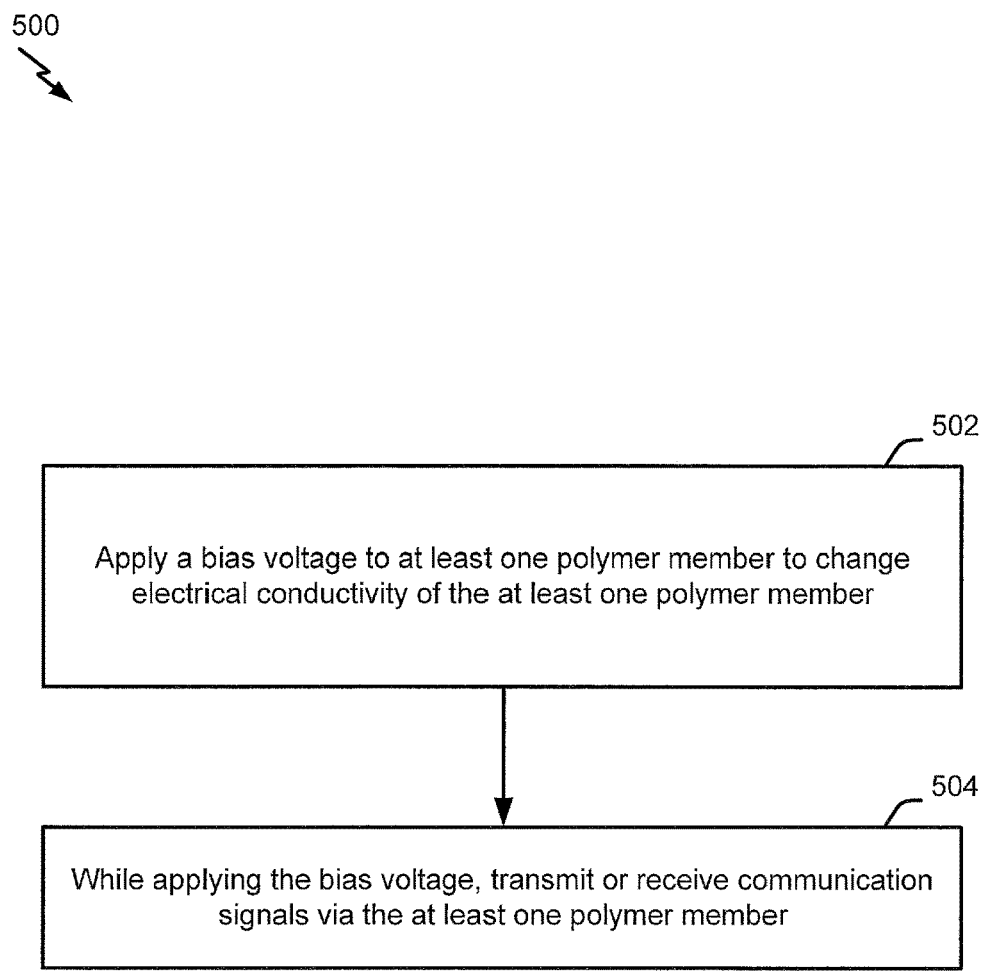
FIG. 5 is a flow chart of an example of a method of operating a communications system including an electrically reconfigurable polymer antenna.

FIG. 5 illustrates a method 500 of operating a communications system including an ERP antenna. The method 500 may be performed by the communications system 100 of FIG. 1 or the controller 112 of FIG. 1. The method 500 includes, at 502, applying a bias voltage to at least one polymer member to change electrical conductivity of the at least one polymer member. The bias voltage may be generated and provided by a bias voltage source. The bias voltage source may include or correspond to the bias voltage source 106 of FIG. 1, and the ion exchange material may include or correspond to the ion exchange material 102 of FIG. 1.

The at least one polymer member may include or correspond to the at least one polymer member 104 of FIG. 1. In some implementations, the least one polymer member includes multiple polymer members including a first polymer member and a second polymer member. For example, the first polymer member may include or correspond to the polymer member 122 of FIG. 1, and the second polymer member may include or correspond to the polymer member 124 of FIG. 1. In some examples, the first polymer member is associated with a first communication frequency range, and the second polymer member is associated with a second communication frequency range. To illustrate, the first communication frequency range and the second communication frequency range may correspond to a narrowband frequency range, a wideband frequency range, a broadband frequency range, a 2.4 GHz channel, a 5.8 GHz channel, or a cellular band (e.g., LTE 4G, 3G, etc.), as described with reference to FIG. 1. In a particular implementation, the first communication frequency range is associated with an IEEE 802.11 communication protocol and the second communication frequency range is associated with a cellular communication protocol (e.g., LTE, GSM, CDMA, etc.).

The method 500 further includes, while applying the bias voltage, transmitting or receiving communication signals via the at least one polymer member, at 504. As described above, application of the bias voltage to the at least one polymer member may activate the at least one polymer member, enabling the at least one polymer member to transmit or receive communication signals. In some examples, the communications system includes a communication circuit, such as the communication circuit 108 described above with reference to FIG. 1. The communication circuit may transmit and/or receive communications signals, as described above with reference to FIG. 1.

The bias voltage may be applied to the at least one polymer member as described above with reference to FIG. 1. To illustrate, the communications system may include one or more switches, such as the one or more switches 110 of FIG. 1, and may include a controller, such as the controller 112 of FIG. 1. The controller may be coupled to the one or more switches and the one or more switches may be coupled to the bias voltage source. The controller may transmit control signals to the one or more switches to apply the bias voltage to the at least one polymer member as described above with reference to FIG. 1.

In some implementations in which the at least one polymer member includes a first polymer member and a second polymer member, the method 500 further includes selecting the first communication frequency and applying a corresponding bias voltage to the first polymer member to configure the first polymer member to operate at the first communication frequency. For example, the first communication frequency may be selected by controller 112, as described above with reference to FIG. 1. Application of the first bias voltage to the first polymer member may change electrical conductivity of the first polymer member, such as from a first state (e.g., non-conductive or a less conductive state) to a second state (e.g., a conductive state or a more conductive state).

The method 500 may also include applying a second bias voltage to a second polymer member of the at least one polymer member to change the electrical conductivity of the second polymer member. For example, application of the second bias voltage to the second polymer member may change the electrical conductivity of the second polymer member to a non-conductive state (or a less conductive state), as described above with reference to FIG. 1. In addition to transmitting or receiving communication signals via the first polymer member, the method 500 further includes transmitting or receiving second communication signals via the second polymer member. The second communication signals have a second frequency range that is different from a first frequency range associated with the communication signals. For example, the first frequency range may be associated with an IEEE 802.11 communication protocol and the second frequency range may be associated with a cellular communication protocol. By utilizing an ERP antenna to transmit or receive communication signals, a size of an electronic device may be reduced as compared to an electronic device that utilizes multiple antennas or mechanically reconfigurable antennas to transmit or receive communication signals.

In some implementations, the method 500 further includes activating at least one switch, where, responsive to activating the at least one switch, a first polymer member of the at least one polymer member is coupled in series with a second polymer member of the at least one polymer member. The at least one switch may include or correspond to the switch 412 of FIG. 4, the switch 414 of FIG. 4, or both. An active length of the at least one polymer member after activating the at least one switch may be greater than an active length of the at least one polymer member prior to activating the at least one switch, as described with reference to FIG. 4.

Figure 6:
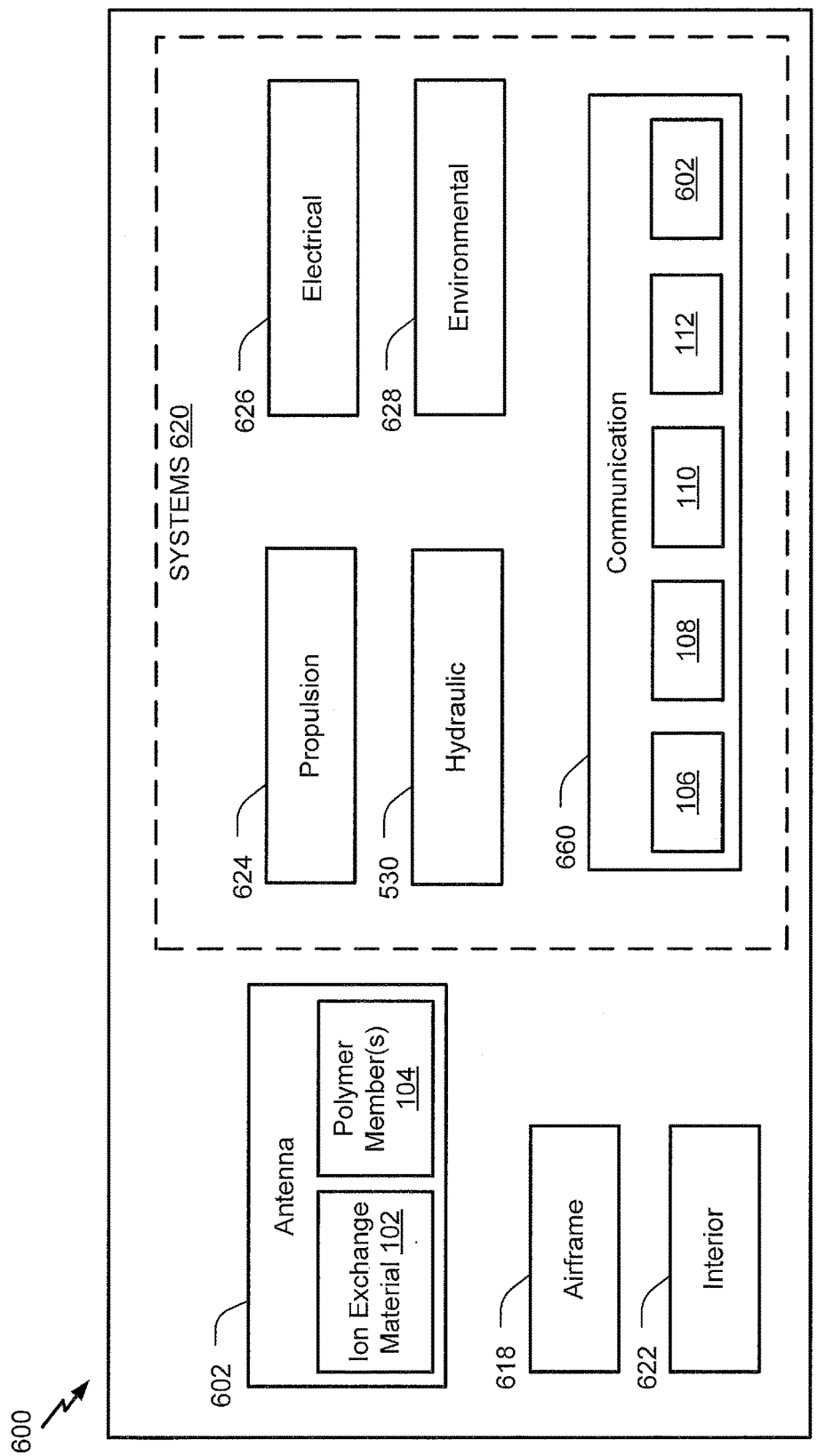
FIG. 6 is a block diagram of an illustrative implementation of an aircraft including a communications system that includes an electrically reconfigurable polymer antenna.

Referring to FIG. 6, a block diagram of an illustrative embodiment of an aircraft 600 (e.g., an airplane or a drone). As shown in FIG. 6, the aircraft 600 includes an airframe 618, an interior 622, an antenna 602, and a plurality of systems 620. The systems 620 may include one or more of a propulsion system 624, an electrical system 626, a hydraulic system 630, an environmental system 628, and a communications system 660. Any number of other systems may be included in the aircraft 600. The communications system 660 includes the bias voltage source 106, the communication circuit 108, the one or more switches 110, and the controller 112 of FIG. 1. The communications system 660 may include the antenna 602, or the antenna 602 may be separate from the communications system 660. The antenna 602 includes the ion exchange material 102 and the at least one polymer member 104 of FIG. 1. The antenna 602 may be installed, or coupled, to the aircraft 600 as an applique. In such implementations, the antenna 602 may include a flexible substrate and may correspond to a conformal antenna. The conformal antenna may be coupled to a curved exterior surface of the aircraft 602. The antenna 602, the bias voltage source 106, the communication circuit 108, the one or more switches 110, and the controller 112 are configured to transmit or receive one or more communication signals as described above with reference to FIGS. 1-5. For example, the controller 112 may be configured to execute computer-executable instructions (e.g., a program of one or more instructions) stored in a memory. The instructions, when executed, cause the controller 112 to perform one or more operations of the method 500.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An antenna comprising:
an ion exchange material; and
multiple polymer members coupled to a communication circuit, the multiple polymer members including a first polymer member and a second polymer member coupleable in series via one or more switches, wherein at least one of the multiple polymer members, responsive to receiving a bias voltage, interacts with the ion exchange material to change electrical conductivity of the at least one of the multiple polymer members, wherein the at least one of the multiple polymer members is a polymer antenna for wirelessly transmitting and receiving communication signals.

2. The antenna of claim 1, wherein the at least one of the multiple polymer members has a first electrical conductivity responsive to a first bias voltage and has a second electrical conductivity responsive to a second bias voltage, and wherein the first electrical conductivity is greater than the second electrical conductivity.

3. The antenna of claim 2, wherein the first electrical conductivity is associated with a conductive state, and wherein the second electrical conductivity is associated with a non-conductive state.

4. The antenna of claim 1, wherein the at least one of the multiple polymer members comprises a material including at least one of a polyaniline, a poly(3,4-ethylenedioxythiophene) (PEDOTs), or a poly(3,4-propylenedioxypyrrole) (poly(ProDOPs)).

5. The antenna of claim 1, wherein the first polymer member has a first length and the second polymer member has a second length, the second length different from the first length.

6. The antenna of claim 1, wherein the ion exchange material comprises a polymer ionic medium, wherein the ion exchange material comprises two ion exchange layers, and wherein the at least one of the multiple polymer members is positioned between the two ion exchange layers.

7. The antenna of claim 1, wherein the ion exchange material comprises 1-Ethyl-3-methylimidazolium bis(trifluoromethylsulfonyl)imide (EMI-IM), and further comprising a layer of polyvinylidene difluoride (PVDF) coupled to or encapsulating the ion exchange material.

8. The antenna of claim 1, wherein the at least one of the multiple polymer members is selectively coupleable with a bias voltage source via the one or more switches.

9. The antenna of claim 1, further comprising an applique that includes the ion exchange material and the multiple polymer members.

10. A communications system comprising:
a communication circuit;
a bias voltage source; and
an antenna comprising:
an ion exchange material; and
multiple polymer members coupled to the communication circuit, the multiple polymer members including a first polymer member and a second polymer member coupleable in series via one or more switches, wherein the at least one of the multiple polymer members, responsive to receiving a bias voltage, interacts with the ion exchange material to change electrical conductivity of the at least one of the multiple polymer members, wherein the at least one of the multiple polymer members is a polymer antenna for wirelessly transmitting and receiving communication signals.

11. The communications system of claim 10, further comprising an array of antennas, wherein each antenna of the array of antennas is switchable between a conductive state and a non-conductive state based on receiving a corresponding bias voltage from the bias voltage source.

12. The communications system of claim 10, wherein the bias voltage source is configured to output a corresponding bias voltage to each polymer member of the multiple polymer members to change electrical conductivity of each polymer member of the multiple polymer members.

13. The communications system of claim 10, further comprising:
the one or more switches coupled to the multiple polymer members and to the bias voltage source; and
a controller coupled to the one or more switches and configured to control the one or more switches based on a communication frequency setting, wherein the one or more switches transfer the bias voltage from the bias voltage source to the at least one of the multiple polymer members responsive to one or more control signals from the controller.

14. The communications system of claim 13, wherein the first polymer member is coupled to the bias voltage source, and wherein the second polymer member is selectively coupleable with the first polymer member and the bias voltage source via the one or more switches.

15. The communications system of claim 10, wherein the communication circuit, the bias voltage source, and the antenna are incorporated on an aircraft, and wherein the antenna is included in an applique that is coupled to an exterior surface of the aircraft.

16. The communications system of claim 10, further comprising a flexible circuit that includes the antenna, wherein the antenna comprises at least one of a monopole antenna, a dipole antenna, an array antenna, a loop antenna, or an aperture antenna.

17. A method comprising:
based on selecting a first communication frequency, applying a bias voltage to at least a first polymer member of multiple polymer members of an antenna, wherein the first polymer member is associated with the first communication frequency and a second polymer member of the multiple polymer members is associated with a second communication frequency, wherein applying the bias voltage changes an electrical conductivity of at least the first polymer member; and while applying the bias voltage to at least the first polymer member, wirelessly transmitting or receiving communication signals associated with a first frequency range of the first communication frequency via the antenna.

18. The method of claim 17, wherein applying the bias voltage to at least the first polymer member includes applying a first bias voltage to the first polymer member applying a second bias voltage to the second polymer member to change electrical conductivity of the second polymer member.

19. The method of claim 18, further comprising transmitting or receiving second communication signals via the second polymer member, wherein the second communication signals are associated with a second frequency range that is different from the first frequency range.

20. The method of claim 19, wherein the communication signals correspond to a first communication protocol, and wherein the second communication signals correspond to a second communication protocol.

21. The method of claim 17, further comprising activating at least one switch, wherein, responsive to activating the at least one switch, the first polymer member is coupled in series with the second polymer member, and wherein an active length of the antenna after activating the at least one switch is greater than an active length of the antenna prior to activating the at least one switch.

\* \* \* \* \*